(12) United States Patent
Pendzimas

(10) Patent No.: US 6,907,689 B2
(45) Date of Patent: Jun. 21, 2005

(54) ICE STRAINER ASSEMBLY FOR USE IN THE SPORT OF ICE FISHING

(76) Inventor: Jeffrey Thomas Pendzimas, 28625 Lakewood Dr., Isanti, MN (US) 55040

( * ) Notice: Subject to any disclaimer, the term of this patent is extended or adjusted under 35 U.S.C. 154(b) by 74 days.

(21) Appl. No.: 10/729,706

(22) Filed: Dec. 6, 2003

(65) Prior Publication Data

US 2004/0111949 A1 Jun. 17, 2004

Related U.S. Application Data

(60) Provisional application No. 60/431,534, filed on Dec. 6, 2002.

(51) Int. Cl.$^7$ .............................................. A01K 69/00
(52) U.S. Cl. .......................................................... 43/4
(58) Field of Search .................... 43/4, 1, 4.5; 210/470, 210/464, 465; 294/53.5

(56) References Cited

U.S. PATENT DOCUMENTS

| | | | | |
|---|---|---|---|---|
| 2,480,924 A | * | 9/1949 | Heger .............................. | 43/4 |
| 2,799,146 A | * | 7/1957 | Meagher ..................... | 249/66.1 |
| 2,877,595 A | * | 3/1959 | Steuart .......................... | 43/56 |
| 2,891,811 A | * | 6/1959 | Strickler ..................... | 294/19.1 |
| 3,056,272 A | * | 10/1962 | Eilers .......................... | 249/79 |
| 3,059,451 A | * | 10/1962 | Anderson .................. | 249/66.1 |
| 3,289,850 A | * | 12/1966 | Gubash ....................... | 210/470 |
| 3,722,940 A | * | 3/1973 | Misjak ........................ | 294/1.1 |
| 3,747,253 A | * | 7/1973 | Gangi et al. .................... | 43/4 |
| 3,857,787 A | * | 12/1974 | Kinne ......................... | 210/470 |
| 4,114,304 A | * | 9/1978 | Hedlund .................. | 126/360.1 |
| 4,218,840 A | * | 8/1980 | Cohee ............................ | 43/4 |
| 4,718,188 A | * | 1/1988 | Roberts ........................... | 43/4 |
| 4,747,226 A | * | 5/1988 | Todd ............................... | 43/4 |
| 4,769,939 A | * | 9/1988 | Gonska et al. ................... | 43/4 |
| 4,845,875 A | * | 7/1989 | Norwick ........................... | 43/4 |
| 4,866,872 A | * | 9/1989 | Guilbault et al. ................ | 43/4 |
| 4,978,156 A | * | 12/1990 | Marhula ..................... | 294/1.1 |
| 5,024,757 A | * | 6/1991 | Malak ........................ | 210/136 |
| 5,072,538 A | * | 12/1991 | Hendricks et al. ............... | 43/4 |
| 5,140,767 A | * | 8/1992 | Traut .............................. | 43/4 |
| 5,784,824 A | * | 7/1998 | Myroniuk ........................ | 43/4 |
| 6,412,213 B1 | * | 7/2002 | Wellard ......................... | 43/12 |
| 6,598,334 B1 | * | 7/2003 | Edevold .......................... | 43/4 |
| 6,618,978 B1 | * | 9/2003 | Miranowski ..................... | 43/4 |
| 6,694,662 B1 | * | 2/2004 | McClure ......................... | 43/4 |

OTHER PUBLICATIONS

Outdoor News Publication, Gear & Gadgets Section, Dec. 1, 2002 Issue, New Hope, Minnesota, United States.

* cited by examiner

*Primary Examiner*—Teri P. Luu
*Assistant Examiner*—Jordan Lofdahl
(74) *Attorney, Agent, or Firm*—Michael A. Mochinski

(57) ABSTRACT

A ice fishing strainer assembly made adaptable for use in the sport of ice fishing, principally serving as means to remove ice particles from a drilled ice hole for unhindered access thereto, the ice fishing strainer comprising in combination a body of cylindrical form having a bottom end for pivotally attaching thereto a strainer plate possessing the capacity to be angularly positioned therewithin by a support rod having an end portion pivotally attached to the strainer plate and an upper end having a lever integrally connected thereto for controlling the rotational movement of the strainer plate and a top end for mounting a brace, principally serving as a handle and means for preventing lateral movement of the support rod during vertical movement thereof, specifically while controlling the angular positioning of the strainer plate to capture and release ice particles from the body of cylindrical form.

18 Claims, 7 Drawing Sheets

ICE STRAINER ASSEMBLY FOR USE IN THE SPORT OF ICE FISHING

CROSS-REFERENCE TO RELATED APPLICATIONS

This application claims the benefit of U.S. Provisional Application No. 60/431,534 filed Dec. 6, 2002, which is incorporated herein by this reference.

FIELD OF THE INVENTION

The present invention relates in general to an assembly made adaptable for use in the sport of ice fishing. More specifically, the present invention serves as means to efficiently remove ice particles from an ice fishing hole without undue repeatability insofar to lessen the time needed to establish unhindered access thereto to engage in the more desirable activity of ice fishing.

BACKGROUND OF THE INVENTION

Many sport enthusiasts come to recognize and utilize various types of instrumentation, equipment, tools and so forth in anticipation of making their desired sport more enjoyable. Ice fishermen, for example, use a shortened angling device known in the art as a tip-up as means to catching fish without expending a great amount of attention thereto, an automated ice auger to drill through and penetrate the ice layer without considerable amount of effort, and an ice scoop to remove particles of ice from a freshly drilled hole and periodically thereafter to break-up and rid the hole of built-up ice forming atop the water surface. The most simplistic device known in the art for removing ice particles from a drilled ice hole comprises a ladle having a handle at one end and another end attached to a concave-shaped screen. Operation of this device simply involves breaking through the layer of ice particles floating atop the water surface, submerging the screen sufficiently therebelow, and lifting upwardly to trap and catch a respective amount of ice particles. This process continues for some time until the drilled ice hole is cleansed of ice particles. Although this type of device is quite popular due to possessing simple design elements for easy operation, it does require the sport's enthusiast to spend a considerable amount of time to achieve an ice hole free of ice particles, which unacceptably delays the more desirable activity of ice fishing.

In accordance with the present invention, applicant has appreciably devised an assembly for removing ice particle from an ice fishing hole without undue repeatability insofar to allow the ice fishing enthusiast to engage in the more desirable aspect of ice fishing in a modest amount of time.

BRIEF SUMMARY OF THE INVENTION

In order to overcome the numerous drawbacks apparent in the prior art, an ice strainer assembly has been devised for use in the sport of ice fishing.

It is thus an object of the present invention to provide a low cost, non-complicated ice strainer assembly which may be reliably used in removing ice particle from a freshly drilled ice fishing hole without undue repeatability.

It is another object of the present invention to provide such an ice strainer assembly which affords one to remove and handle a sufficient amount of ice particle without having to come into direct contact therewith.

It is yet another object of the present invention to provide such an ice strainer assembly which is capable of being easily operated to the likes of other known prior art devices specifically dedicated for removing ice particles from a drilled ice fishing hole, such as the type comprising a ladle adaptably fitted with a concave-shaped screen as noted herein.

It is yet another object of the present invention to provide such an ice strainer assembly which is fabricated from a moderately-weighted material and transportable to remote ice fishing destinations.

It is yet another object of the present invention to provide such an ice strainer assembly which accomplishes the foregoing and other objects and advantages and which is economical, durable, and fully effective in performing its intended functions.

In accordance with the present invention, an ice strainer assembly has been devised for use in the sport of ice fishing, the ice strainer assembly comprising in combination a body of cylindrical form having a bottom end for pivotally attaching thereto a strainer plate possessing the capacity to be angularly positioned therewithin by a support rod having an end portion pivotally attached to a pivot plate integrally made part of the strainer plate and extending upwardly therefrom and an upper end having a lever integrally connected thereto for controlling the rotational movement of the strainer plate and a top end for mounting a brace, principally serving as a handle and means for preventing lateral movement of the support rod during vertical movement thereof, specifically while controlling the angular positioning of the strainer plate to capture and release ice particles from the body of cylindrical form.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as an apparatus for removing suspended ice particles from a drilled ice fishing hole to allow unhindered access thereto and permit one to engage in the more desirable aspect of ice fishing in a modest amount of time.

Figure 1:
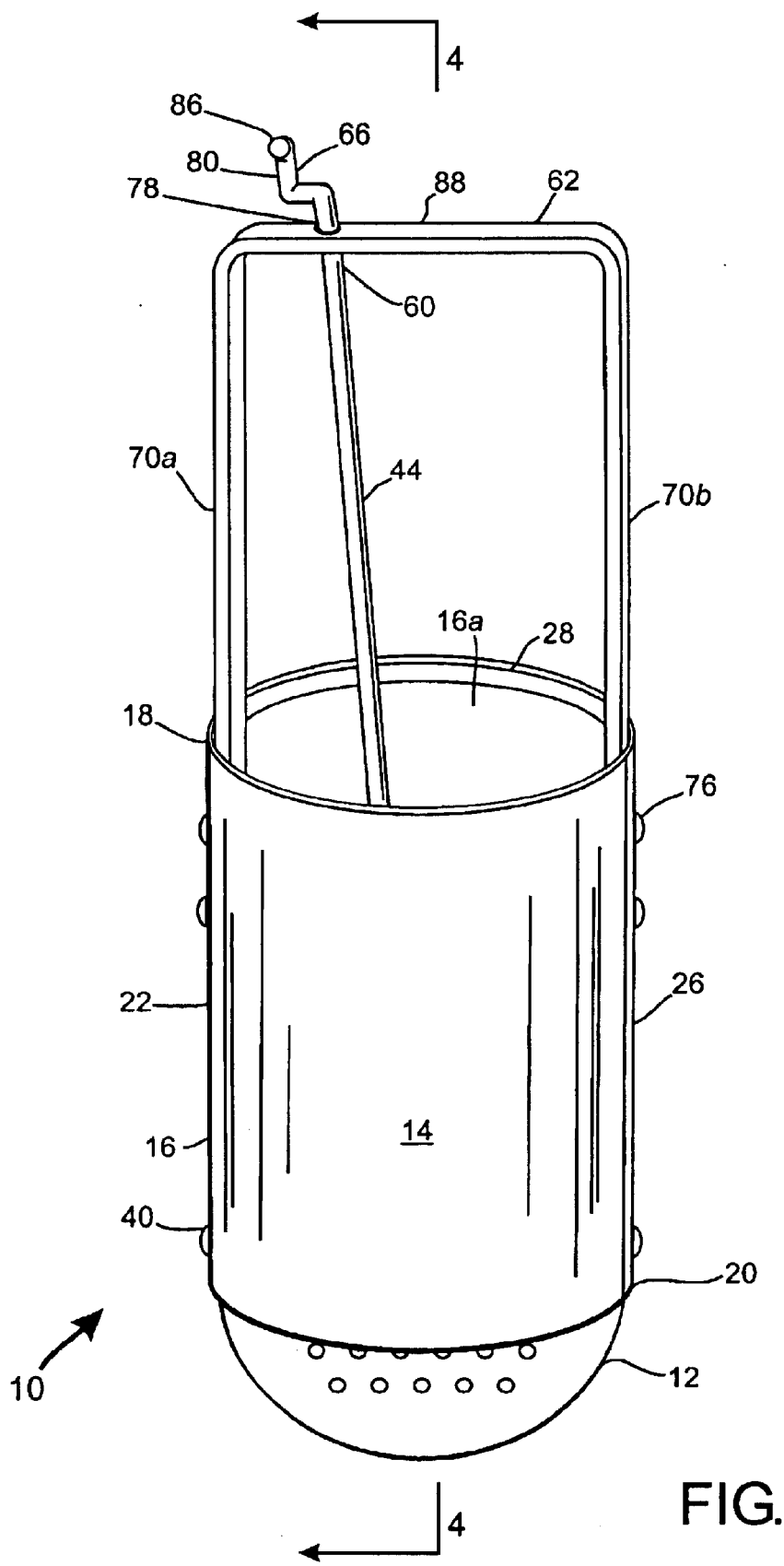
FIG. 1 is a perspective view of the preferred embodiment of the present invention illustrating a body of cylindrical form fitted with a support rod extending through a brace.

Referring now to FIG. 1, there is shown generally at 10 an ice fishing strainer assembly comprising a strainer plate 12 pivotally fastened to a body 14 having a cylindrical wall 16, top and bottom ends 18, 20, and a midsection 22. In the preferred embodiment, the body is fabricated from a flattened piece of galvanized sheet metal comprising two side ends 24a, 24b each of which is configurably positioned to overlap one another to form a seam 26 extending the entire length thereof and held together using a plurality of rivets configurably arranged along the seam or secured in place by other fastening means generally known and accepted in the art. In an alternative embodiment, each side end may comprise a folded, overlapping portion (not shown herein) configurably arranged to engage and mate with one another insofar to lock the side ends together to form the desired cylindrical shape of the body 14 without the need of external fasteners. Since the preferred choice of material comprises sheet metal generally known in the art to possess a moderately sharp edge upon fabrication, the top and bottom ends each comprise a hem 28 extending circumferentially thereabout. The hem is preferably fabricated by simply folding over an inner side 18a, 20a of each of the top and bottom ends 18, 20 and movably positioning the inner side until it contacts and flatteningly mates with an inner surface 16a of the cylindrical wall.

Figure 2:
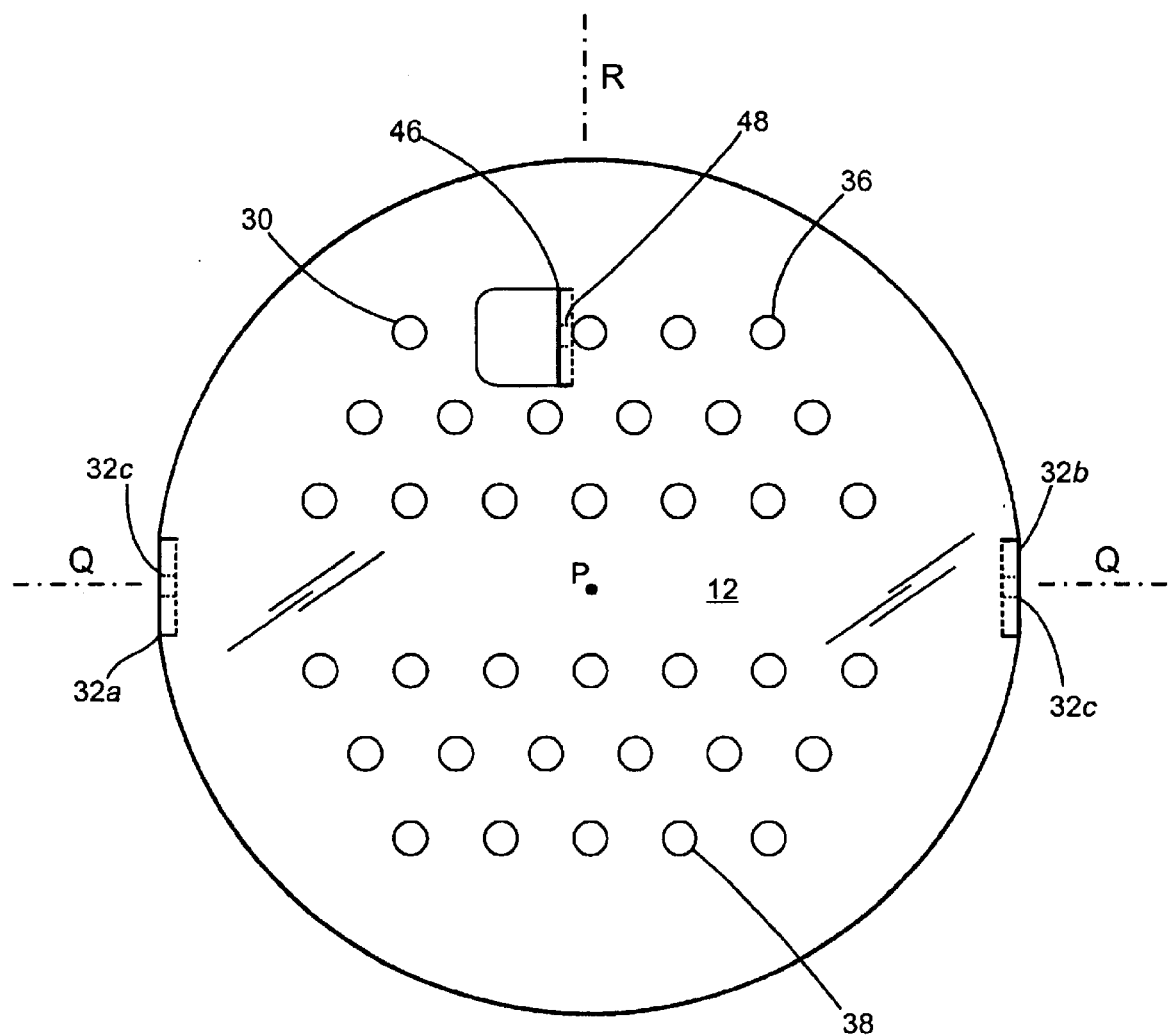
FIG. 2 is a top plan view of the preferred embodiment of the present invention illustrating a strainer plate adaptably fitted with a pair of connecting flanges and comprising a plurality of apertures extending therethrough.
Figure 3:
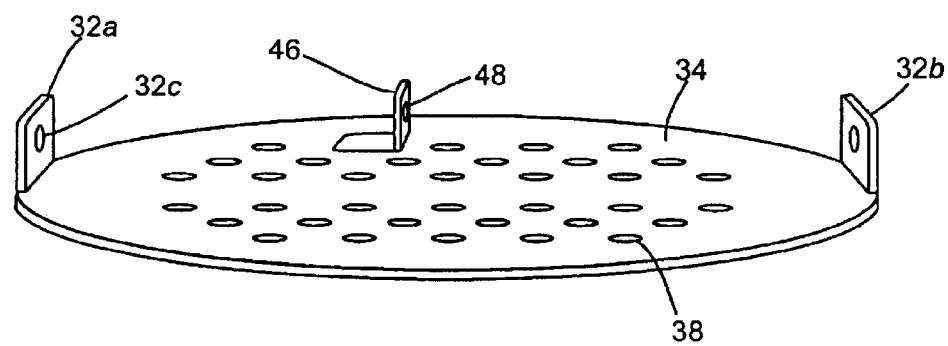
FIG. 3 is a side perspective view of the preferred embodiment of the present invention illustrating a strainer plate as shown in FIG. 2.
Figure 4:
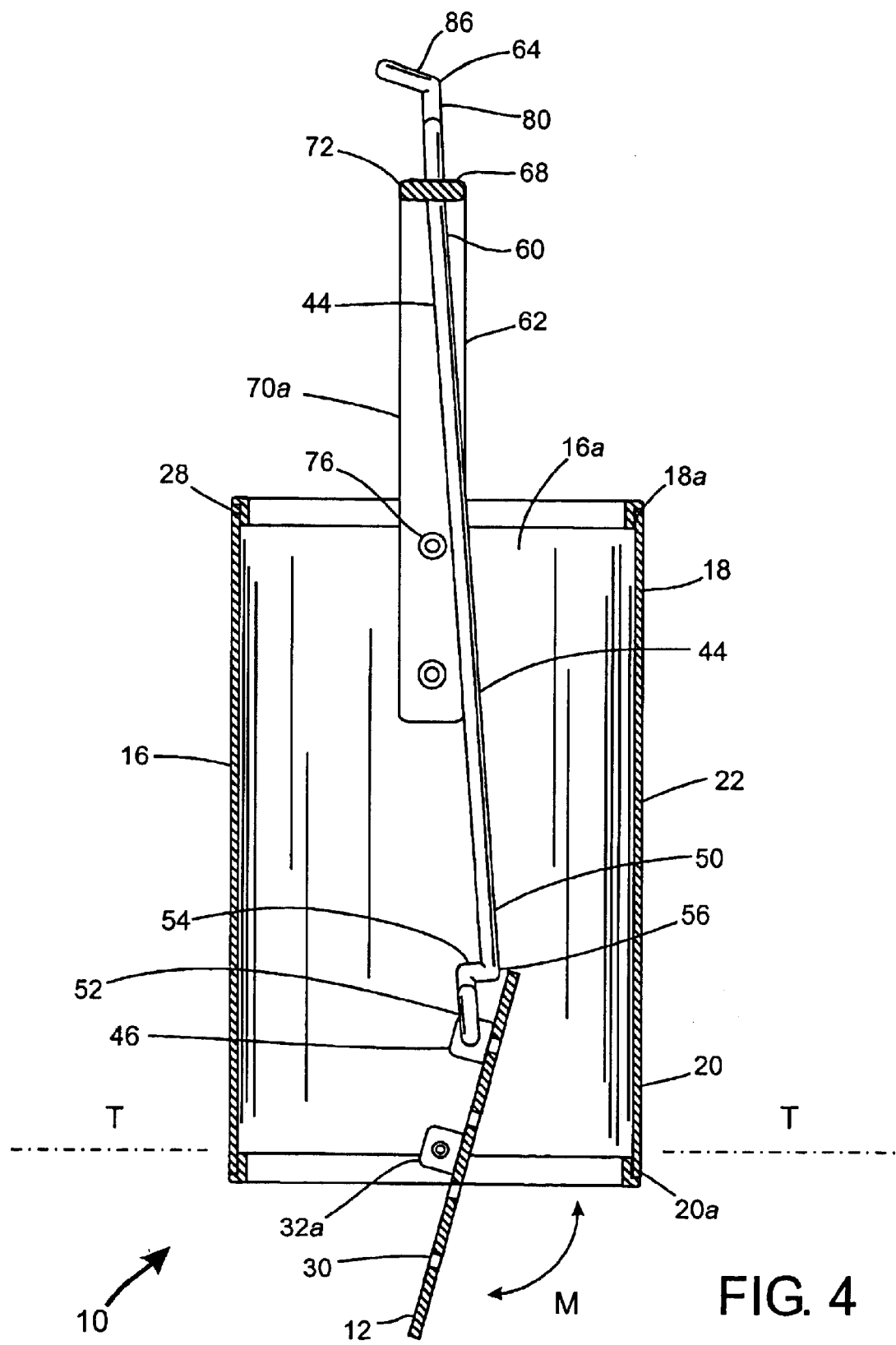
FIG. 4 is a side cross sectional view of the preferred embodiment of the present invention taken on line 4—4 of FIG. 1 illustrating a strainer plate angularly positioned within a body of cylindrical form.

As illustrated in FIGS. 3 and 4, the strainer plate 12 comprises a plurality of apertures 30 extending therethrough and a pair of connecting flanges 32a, 32b extending upwardly and outwardly therefrom to serve as means for attaching the strainer plate to the body 14. Each connecting flange is preferably located along the outer periphery of the strainer plate, oppositely placed from one another, and extends perpendicular to a planer surface 34 of the strainer plate, substantially in parallel arrangement with the cylindrical wall 16 of the body. The strainer plate apertures 30 principally function to allow selective passing of liquids, such as water collected during the activity of removing ice particles from a drilled ice hole, from above the midsection 22 downward toward the bottom end 20 of the body as the ice fishing strainer assembly 10 is lifted from the drilled ice hole. Preferably, the strainer plate apertures comprise first and second sets 36, 38 each being located on each side of a diametric axis Q extending through the aligned connecting flanges 32a, 32b and through a center point P of the strainer plate 12, as shown in FIG. 2. In order to allow the strainer plate to pivot and rotate about the diametric axis Q, each connecting flange is positionally mounted to the cylindrical wall 16, substantially near the bottom end 20 of the body 14, through use of an equivalent number of fasteners 40 configurably aligned with the diametric axis Q and extending through an aperture 32c of the connecting flange and cylindrical wall. Only through this pivoting arrangement will the strainer plate not impede the body's placement into the drilled ice hole and increase the likelihood of forcing the ice particles downwardly and deeper into the drilled ice hole. In other words, water pressure forces exerted on the body 14 as one proceeds to place the ice fishing strainer assembly 10 into the drilled ice hole are diminished if the strainer plate's planer surface 34 is somewhat angularly aligned with the motion of travel. Additionally, suspended ice particles are permitted to flow past the strainer plate 12 without substantial interruption insofar to allow greater capture of ice particles in less time upon closing the strainer plate, generally occurring when the planer surface of the strainer plate is suitably positioned perpendicular to the cylindrical wall 16, and lifting upwardly the ice fishing strainer assembly 10 from the drilled ice hole. In the preferred embodiment, the strainer plate is acceptably allowed to rotate and travel from a horizontal axis T at 0° established perpendicular to the longitudinal axis of the body 14 to approximately 80° upward along path M in FIG. 4.

Figure 5:
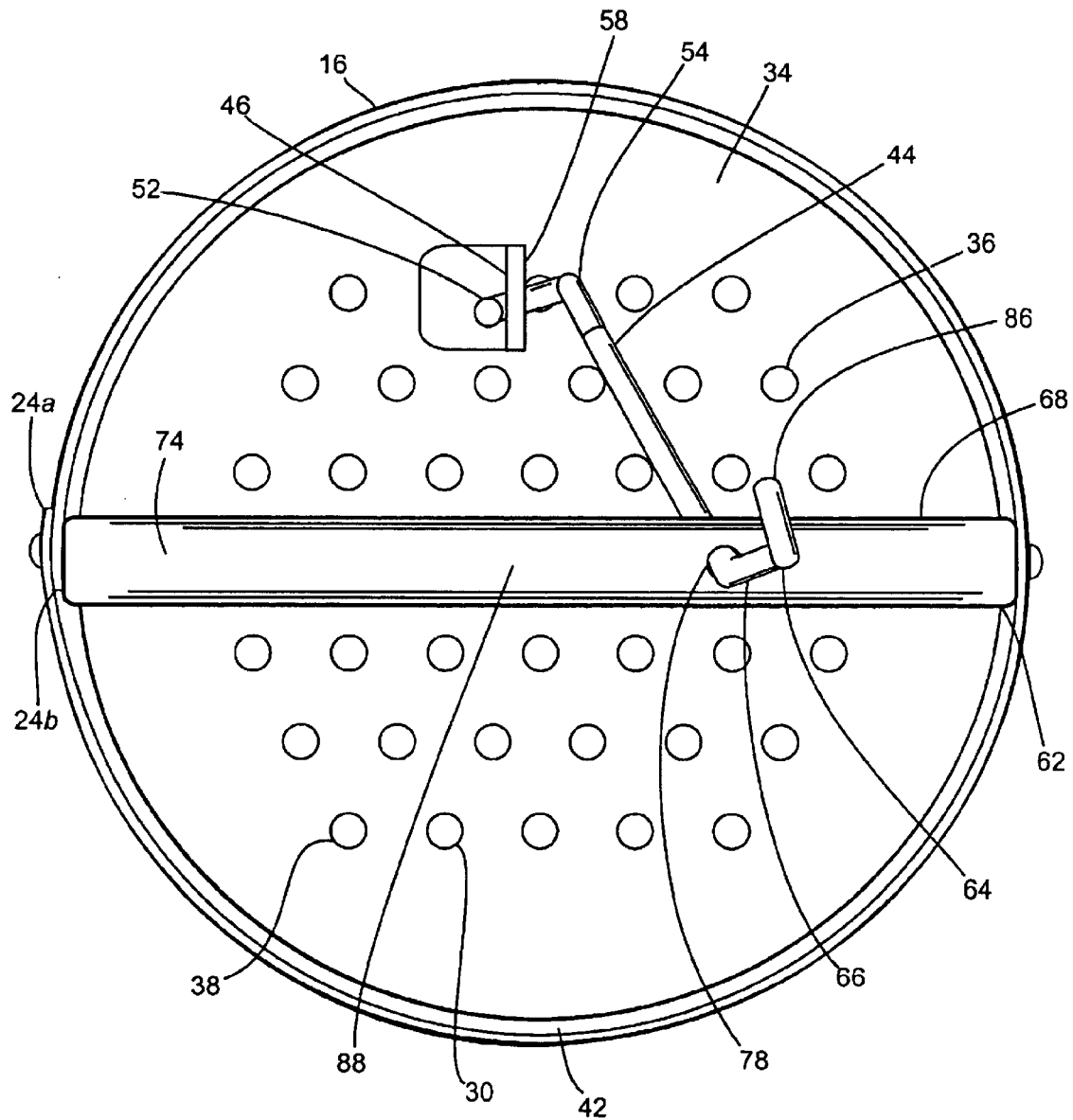
FIG. 5 is a top plan view of the preferred embodiment of the present invention illustrating a brace adaptably fitted to a top end of a body of cylindrical form and a strainer plate positioned therebelow.
Figure 6:
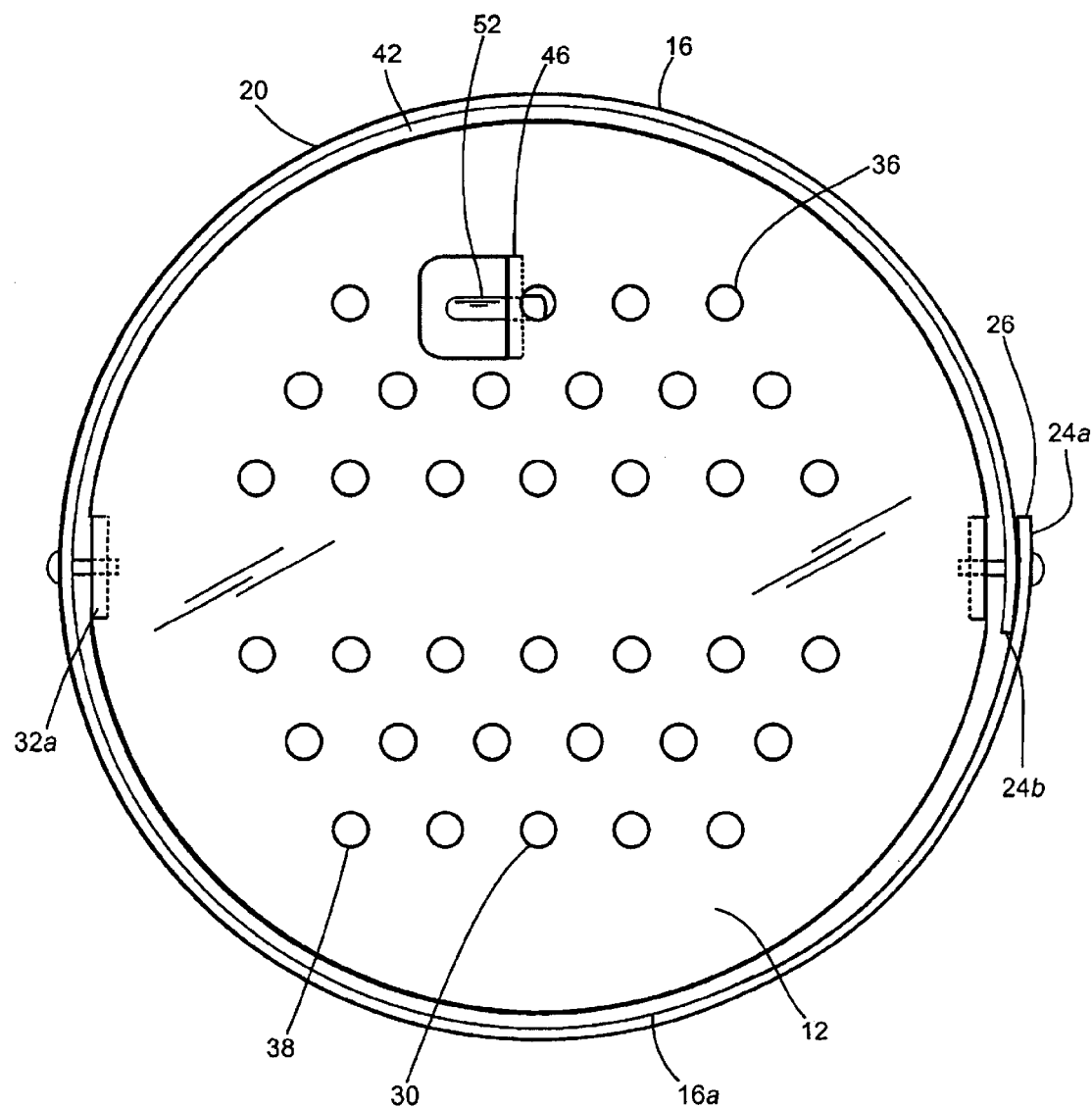
FIG. 6 is a bottom plan view of the preferred embodiment of the present invention illustrating a strainer plate adaptably fitted within a bottom end of a body of cylindrical form.
Figure 7:
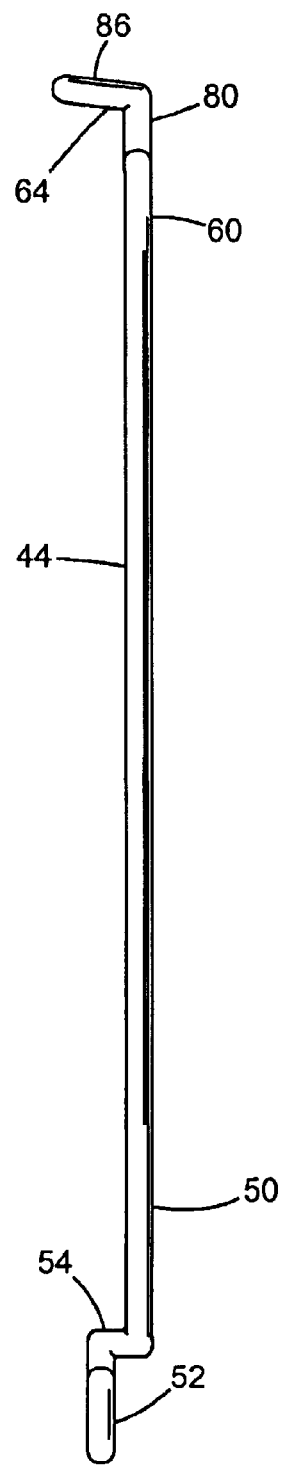
FIG. 7 is a side elevational view of the preferred embodiment of the present invention illustrating a support rod comprising a J-shaped hook and a lever integrally attached thereto.
Figure 8:
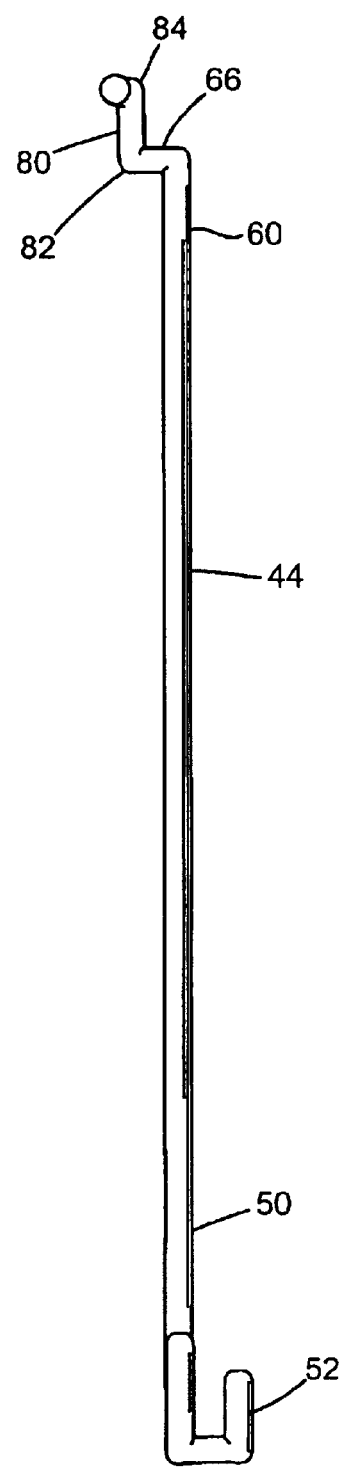
FIG. 8 is a front elevational view of the preferred embodiment of the present invention illustrating a support rod comprising a J-shaped hook and a lever integrally attached thereto.
Figure 9:
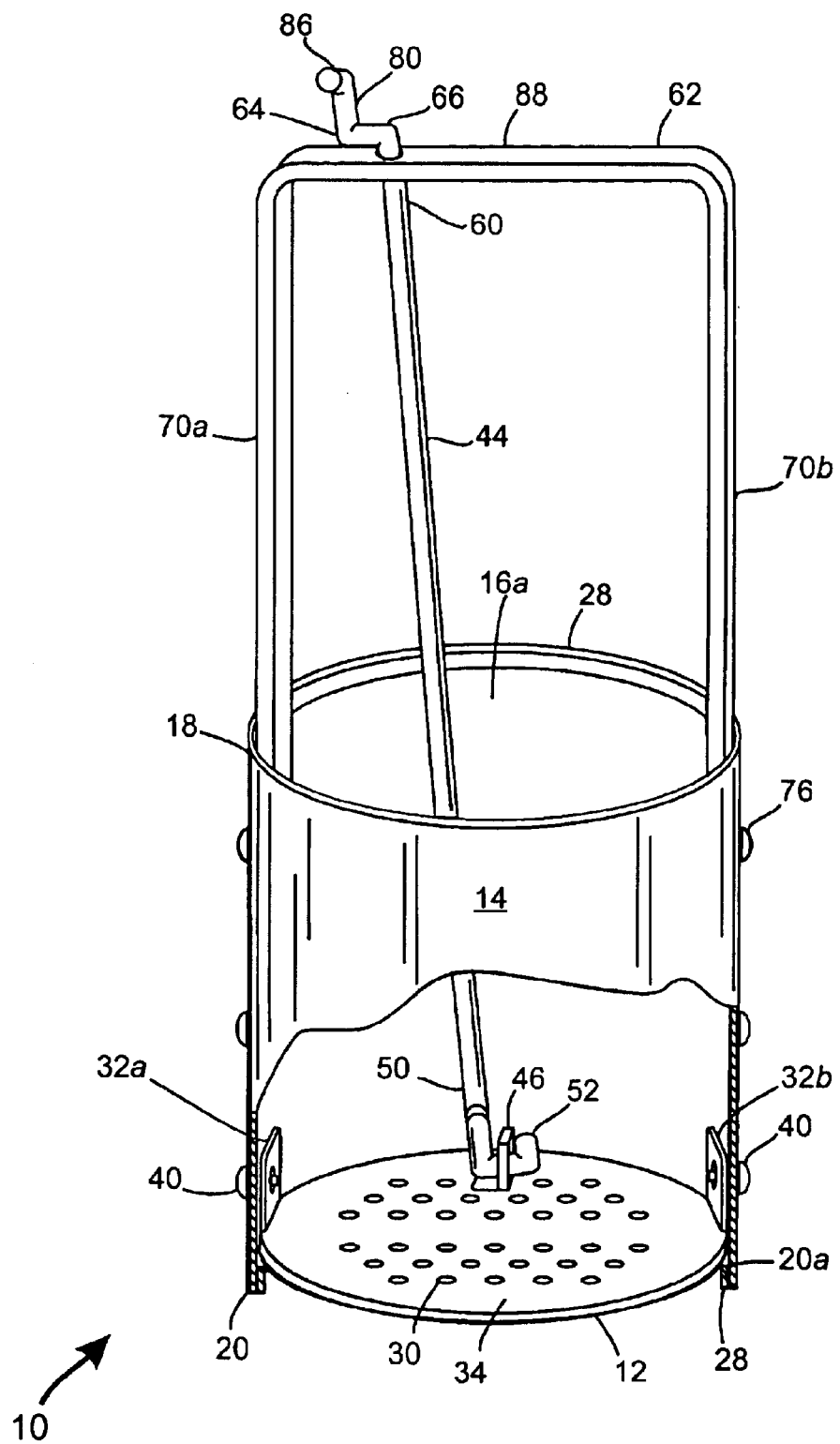
FIG. 9 is a perspective view of the preferred embodiment of the present invention illustrating a cutaway portion thereof showing the position of a strainer plate within a body of cylindrical form.

Referring now to FIGS. 5 and 6, the strainer plate 12 further comprises a diameter slightly less than the effective inner diameter of the body 14 to form an annular space 42 therein between and means for controlling pivotal movement of the strainer plate about the diametric axis Q established through the two connecting flanges 32a, 32b and center point P. The annular space primarily functions to alleviate the extent to which the strainer plate engages the cylindrical wall 16 to provide unhindered rotational movement of the strainer plate, in addition to supplementing as access means for the return of collected liquids back into the drilled ice hole. Preferably, controlling means comprises a support rod 44 connectively fastened to a pivot plate 46 extending upwardly and outwardly from the planer surface 34 of the strainer plate, substantially in the same manner described for the connecting flanges 32a, 32b. As means of increasing the extent of leverage for effortless rotational positioning of the strainer plate about the diametric axis Q, the pivot plate is centrally positioned within the first set of apertures 36, specifically being situated along a radial line R established perpendicular to the diametric axis Q and centrally about the two connecting flanges, as best illustrated in FIG. 2 The pivot plate 46 further comprises an aperture 48 for receiving an end portion 50 of the support rod 44 having a J-shaped hook 52 supportably extending therefrom a predetermined distance by an outwardly extending arm 54, preferably being positioned perpendicular to the longitudinal axis of the support rod. As depicted in FIG. 4, the positioning of the J-shaped hook away from the support rod 44 permissively allows the strainer plate 12 to come into contact with a portion 56 of the support rod where it connects to the outwardly extending arm 54 to effectively serve in preventing the strainer plate from rotatably moving beyond 80° from horizontal axis T, most noticeably apparent when the support rod is selectively moved upward and positioned thereat. This stopping feature suitably prevents binding of the strainer plate with the support rod as it is fully extended upward to allow the flow of ice particles into the body 14 and ensures downward leveraging of the support rod against the strainer plate to permit momentary closing thereof to capture ice particles. In assembled form, the J-shaped hook 52 will be configurably positioned through the aperture 48 and pivotally coupled to the pivot plate 46, while the outwardly extending arm 54 will be angularly positioned to a planer face 58 of the pivot plate. To permit unrestricted pivotal movement of the strainer plate 12 during use of the ice fishing strainer assembly 10, the J-shaped hook preferably comprises a cross sectional diameter slightly less than the aperture 48 of the pivot plate. Connected to an upper end 60 of the support rod 44 and extending above a brace 62 is a lever 64 which conveniently serves as means for controlling the extent to which the support rod 44 is moved upward and downward to selectively control the angular position of the strainer plate 12 within the body 14. Similar to the configuration for attaching the J-shaped hook 52 to the support rod, the lever is connectively fastened to the upper end 60 by a shoulder member 66 extending outwardly 90° from the support rod. The shoulder member primarily functions in preventing the support rod 44 from moving downwardly beyond acceptable limits for the strainer plate's positioning within the body 14. In other words, the planer surface 34 of the strainer plate is optimally placed in a perpendicular position relative to the cylindrical wall 16 as the support rod is slidably moved downward and the shoulder member 66 contacts a portion of the brace 62. The brace preferably comprises a horizontal member 68 situated in between two vertical support members 70a, 70b, all of which being configurably formed from a continuous piece of tubing having an oval-shaped cross section 72. As depicted in FIGS. 1 and 7, the horizontal member suitably serves as a handle 74 for managing the ice fishing strainer assembly 10 to and from the drilled ice hole and during moments of transport to ice fishing destinations. Each support member is fixedly attached to the cylindrical wall 16 of the body, substantially in between the midsection 22 and top end 18 thereof, principally through use of a plurality of rivets 76 or equivalent means appreciably known in the art. To mitigate lateral movement of the support rod 44 as it moves longitudinally about the body 14 and provide accessible means for controlling the strainer plate's positioning within the body, the horizontal member 68 comprises an aperture 78 for receiving therethrough the upper end 60 of the support rod to optimally position the lever 64 above the brace. Preferably, as illustrated in FIGS. 7 and 8, the lever comprises a vertical shaft 80 having an end 82 integrally connected to the shoulder member 66 and an opposite end 84 connected to a grip 86 extending outwardly therefrom. As shown in FIGS. 5 and 9, the horizontal member's aperture 78 is suitably placed in between the location where one of the vertical supports 70a is connected to the horizontal member 68 and the horizontal member's center point 88, thereby establishing an angular relation of the support rod within the body, particularly being apparent as the upper end 60 thereof is slidably fitted through the aperture 78 and the end portion 50 thereof is pivotally connected to the pivot plate 46. This aperture arrangement sufficiently allows room for one to grasp the horizontal member with one hand and engage the grip 86 and operate the lever 64 therewith in furtherance of managing the strainer plate's positioning within the body 14.

In operation, the ice fishing strainer assembly 10 is initially prepared for placement in the drilled ice hole by grasping the grip 86 to angularly position the strainer plate 12 in the most desirable position, namely at an angular position of 80° from the horizontal axis T extending perpendicular to the body 12, as noted hereinbefore. The ice fishing strainer assembly 10 is then inserted into the drilled ice hole with the bottom end 20 of the body making initial contact with the water surface and breaking therethrough and continuing to submerge the body until the water level is principally established in between the top end 18 and midsection 22, preferably 6" above the strainer plate while in a fully open state. In some instances, it may be necessary to go beyond this level should the suspended ice particle extend well below the water surface in order to capture a respectful amount of ice particles. After waiting momentarily for the ice particles to re-establish at and below the water surface, the strainer plate 12 is rotatably moved to a closed position by selectively engaging the grip 86 and moving downwardly therewith until no further vertical movement is made possible, generally occurring when the shoulder member 66 contacts a portion of the horizontal member 68. Once the strainer plate is established in this closed position, the horizontal member 68 of the brace 62, sufficiently serving as a handle 74, is firmly grasped and pulled upwardly in slow fashion until the bottom end 20 clears beyond the water surface and momentarily held at this location to allow collected water to strain from and through the body 14 and flow freely back into the drilled ice hole. After notably observing the return of collected water, the ice fishing strainer assembly 10 is movably placed to a desired location and released of ice particles by simply lifting upwardly on the grip 86 to angularly move and position the strainer plate 12 to a fully open state.

It can be seen from the foregoing that there is provided in accordance with this invention a simple and easily operated device, which is particularly suitable for removing ice particles from a drilled ice hole. The ice fishing strainer assembly 10 is completely functional in the sport of ice fishing, primarily enabling one to remove ice particle from the drilled ice hole with greater ease and without undue repeatability insofar to allow one to engage in the more desirable aspect of ice fishing. It is obvious that the components comprising the ice fishing strainer assembly 10 may be fabricated from a variety of materials, providing such selection or use of materials possess the capacity to withstand forces acting thereon throughout its duration of use in an ice fishing setting and withstand temperatures one would expect to encounter during outdoor ice fishing expeditions. Accordingly, it is most desirable, and therefore preferred, to construct the brace 62 from tubular material comprised of galvanized metal and a body 14 and strainer plate 12 from a rigid material such as galvanized sheet metal or an equivalent material appreciably known and available in the art. To lessen the cost and simply construction of the ice fishing strainer assembly 10, the strainer plate and components made part thereof are preferably fabricated from a unified piece of sheet metal, with the pivot plate 46 and connecting flanges 32a, 32b being stamped and selectively bent and formed therefrom to achieve their desired utility. As stated hereinbefore, the body 14 of the ice fishing strainer assembly 10 is also fabricated from a unified piece of sheet metal and rolled into a cylindrical shape to accommodate the geometric proportions of the drilled ice hole.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. An ice fishing strainer assembly for removing ice particles from a pre-drilled ice fishing hole, said assembly comprising, in combination:

a body of cylindrical form having top and bottom ends and a midsection situated therebetween;

a strainer plate having a plurality of apertures extending therethrough to allow selective passage of water while affording capture of ice particles and a pair of connecting flanges diametrically positioned thereabout to serve as means for pivotally attaching said strainer plate to said body, said strainer plate comprising a pivot plate extending upwardly from a planer surface of said strainer plate; and a support rod having an end portion substantially in the form a J-shaped hook extending through an aperture of said pivot plate and an upper end extending above and beyond said top end of said body to control pivotal movement of said strainer plate housed within said body, particularly about the diametric positioning of said connecting flanges, said J-shaped hook being fixedly attached to said support rod by an outwardly extending arm extending a predetermined distance from and positioned perpendicular to the longitudinal axis of said support rod, collectively serving to limit the extent to which said strainer plate pivotally travels about said connecting flanges within said body insofar to prevent binding thereof upon said support rod being downwardly forced to close said strainer plate.

2. An ice fishing strainer assembly as set forth in claim 1, wherein each of said connecting flanges extend outwardly from the outer periphery of said strainer plate, substantially being positioned perpendicular to a planer surface of said strainer plate, and fastened to said body by an equivalent number of fasteners.

3. An ice fishing strainer assembly as set forth in claim 1, wherein said strainer plate comprises a smaller outer diameter than the effective inner diameter of said body, collectively forming an annular space to permit unhindered rotational movement of said strainer plate and serve as supplemental means for passing captured water downwardly beyond said bottom end upon lifting said body from the pre-drilled ice fishing hole.

4. An ice fishing strainer assembly as set forth in claim 1, further comprising a brace having a horizontal member situated in between and integrally connected to a pair of vertical support members each having ends affixed to said body, collectively establishing a handle situated above and beyond said top end, said horizontal member having an aperture extending therethrough to permit passage of a portion of said controlling means.

5. An ice fishing strainer assembly as set forth in claim 1, wherein said strainer plate, support rod and body are collectively fabricated from a galvanized metal.

6. An ice fishing strainer assembly as set forth in claim 1, wherein said strainer plate pivotally moves about said connecting flanges and travels to a maximum angular position of approximately 80° from an axis extending perpendicular to said body.

7. A method of separating ice particles from an ice-water mixture present in a pre-drilled ice fishing hole, said method comprising the steps of:

providing a body of cylindrical form having top and bottom ends and a midsection situated therebetween;

placing within said body a strainer plate having a plurality of apertures extending therethrough to allow selective passage of water while affording capture of ice particles and a pair of connecting flanges diametrically positioned thereabout and fastened to said body by an equivalent number of fasteners substantially capable of allowing pivotal movement of said strainer plate thereabout while housed within said body;

configuring within said body a support rod having an end portion substantially in the form a J-shaped hook to engage with a pivot plate extending upwardly from a planer surface of said strainer plate and an upper end extending above and beyond said top end of said body, said J-shaped hook being fixedly attached to said support rod by an outwardly extending arm extending a predetermined distance from and positioned perpendicular to the longitudinal axis of said support rod, collectively serving to limit the extent to which said strainer plate pivotally travels about said connecting flanges within said body insofar to prevent binding thereof upon said support rod being downwardly forced to close said strainer plate;

lifting upwardly on said support rod to open said strainer plate before placement within the pre-drilled ice fishing hole; and allowing the ice-water mixture to flow upwardly past an angularly positioned strainer plate to fill said body at or above said midsection and pushing downwardly on said support rod to close said strainer plate for capture of ice particles.

8. A method as set forth in claim 7, wherein said strainer plate is substantially positioned at said bottom end of said body.

9. A method as set forth in claim 7, further comprising the step of attaching to said body a brace having a horizontal member situated in between and integrally connected to a pair of vertical support members each having ends affixed to said body, collectively establishing a handle situated above and beyond said top end.

10. An ice fishing strainer assembly for removing ice particles from a pre-drilled ice fishing hole, said assembly comprising, in combination:

a body of cylindrical form having top and bottom ends and a midsection situated therebetween;

a strainer plate having a plurality of apertures extending therethrough to allow selective passage of water while affording capture of ice particles and a pair of connecting flanges diametrically positioned thereabout and fastened to said body by an equivalent number of fasteners;

a brace having a horizontal member situated in between and integrally connected to a pair of vertical support members each having ends affixed to said body, collectively establishing a handle situated above and beyond said top end; and a support rod having an end portion substantially in the form a J-shaped hook to engage with a pivot plate extending upwardly from a planer surface of said strainer plate and an upper end extending above and beyond said top end of said body and comprising a lever having a vertical shaft with one end integrally connected to a shoulder member and an opposite end integrally connected to a grip extending outwardly therefrom suitably serving as a location for handling and moving said support rod to control said strainer plate.

11. An ice fishing strainer assembly as set forth in claim 10, wherein said a horizontal member comprises an aperture to permit passage of said upper end to optimally orientate said support rod about said body and above said strainer plate.

12. An ice fishing strainer assembly as set forth in claim 10, wherein said strainer plate is substantially positioned at said bottom end of said body.

13. An ice fishing strainer assembly as set forth in claim 10, wherein said strainer plate pivotally moves about said connecting flanges and travels to a maximum angular position of approximately 80° from an axis extending perpendicular to said body.

14. An ice fishing strainer assembly as set forth in claim 10, wherein said strainer plate, brace, support rod and body are collectively fabricated from a galvanized metal.

15. An ice fishing strainer assembly as set forth in claim 10, wherein said top and bottom ends each comprise a hem extending circumferentially thereabout to eliminate the presence of a sharp edge.

16. An ice fishing strainer assembly as set forth in claim 10, wherein said strainer plate comprises a smaller outer diameter than the effective inner diameter of said body, collectively forming an annular space to permit unhindered rotational movement of said strainer plate and serve as supplemental means for passing captured water downwardly beyond said bottom end upon lifting said body from the pre-drilled ice fishing hole.

17. An ice fishing strainer assembly for removing ice particles from a pre-drilled ice fishing hole, said assembly comprising, in combination:

a body of cylindrical form having top and bottom ends and a midsection situated therebetween;

a strainer plate having a plurality of apertures extending therethrough to allow selective passage of water while affording capture of ice particles and a pair of connecting flanges diametrically positioned thereabout to serve as means for pivotally attaching said strainer plate to said body, said strainer plate comprising a pivot plate extending upwardly therefrom; and a support rod having an end portion substantially in the form a J-shaped hook extending through an aperture of said pivot plate and an upper end extending above and beyond said top end of said body and comprising a lever having a vertical shaft with one end integrally connected to a shoulder member and an opposite end integrally connected to a grip extending outwardly therefrom suitably serving as a location for handling and moving said support rod to control pivotal movement of said strainer plate housed within said body, particularly about the diametric positioning of said connecting flanges.

18. An ice fishing strainer assembly for removing ice particles from a pre-drilled ice fishing hole, said assembly comprising, in combination:

a body of cylindrical form having top and bottom ends and a midsection situated therebetween;

a strainer plate having a plurality of apertures extending therethrough to allow selective passage of water while affording capture of ice particles and a pair of connecting flanges diametrically positioned thereabout and fastened to said body by an equivalent number of fasteners;

a brace having a horizontal member situated in between and integrally connected to a pair of vertical support members each having ends affixed to said body, collectively establishing a handle situated above and beyond said top end; and a support rod having an end portion substantially in the form a J-shaped hook to engage with a pivot plate extending upwardly from a planer surface of said strainer plate and an upper end extending above and beyond said top end of said body, said J-shaped hook being fixedly attached to said support rod by an outwardly extending arm extending a predetermined distance from and positioned perpendicular to the longitudinal axis of said support rod, collectively serving to limit the extent to which said strainer plate pivotally travels about said connecting flanges within said body insofar to prevent binding thereof upon said support rod being downwardly forced to close said strainer plate.

* * * * *